United States Patent
Bothello et al.

(10) Patent No.: US 10,395,194 B2
(45) Date of Patent: Aug. 27, 2019

(54) RESOURCE ALLOCATION FOR INFRASTRUCTURE ENGINEERING

(71) Applicant: Wal-Mart Stores, Inc., Bentonville, AR (US)

(72) Inventors: Gerald Bothello, Foster City, CA (US); Kamal Manglani, Burlingame, CA (US); Radhakrishna Chaganti, Cupertino, CA (US); Darrin Alves, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 351 days.

(21) Appl. No.: 14/109,183

(22) Filed: Dec. 17, 2013

(65) Prior Publication Data

US 2015/0170081 A1    Jun. 18, 2015

(51) Int. Cl.
*G06Q 10/00* (2012.01)
*G06Q 10/06* (2012.01)

(52) U.S. Cl.
CPC ... *G06Q 10/06313* (2013.01); *G06Q 10/0631* (2013.01); *G06Q 10/063112* (2013.01)

(58) Field of Classification Search
CPC ............ G06Q 10/06313; G06Q 10/06; G06Q 10/063; G06Q 10/06311; G06Q 10/063114; G06Q 10/0639; G06Q 10/06312; G06Q 10/0631; G06Q 10/063112; G06Q 10/063118
See application file for complete search history.

(56) References Cited

U.S. PATENT DOCUMENTS

| | | | | |
|---|---|---|---|---|
| 8,386,286 | B2* | 2/2013 | Srinivas | G06Q 10/06 705/7.11 |
| 8,738,414 | B1* | 5/2014 | Nagar | G06Q 10/103 705/7.12 |
| 8,811,597 | B1* | 8/2014 | Hackbarth | G06Q 10/06393 379/265.02 |
| 2005/0043979 | A1* | 2/2005 | Soares | G06Q 10/06398 705/7.42 |
| 2005/0114829 | A1* | 5/2005 | Robin | G06Q 10/06 717/101 |
| 2011/0202382 | A1* | 8/2011 | Santos | G06Q 10/06 705/7.17 |
| 2012/0053977 | A1* | 3/2012 | Bagheri | G06Q 10/063112 705/7.14 |
| 2012/0197677 | A1* | 8/2012 | Bhamidipaty | G06Q 10/06311 705/7.13 |
| 2014/0025418 | A1* | 1/2014 | Huang | G06Q 10/06313 705/7.23 |
| 2014/0122143 | A1* | 5/2014 | Fletcher | G06Q 10/0631 705/7.14 |

OTHER PUBLICATIONS

Kang, D. , Jung, J. and Bae, D. (2011), Constraint-based human resource allocation in software projects. Software: Practice and Experience, 41: 551-577. (Year: 2011).*

* cited by examiner

*Primary Examiner* — William S Brockington, III
(74) *Attorney, Agent, or Firm* — Bryan Cave Leighton Paisner LLP (57) ABSTRACT

Example systems and methods for resource allocation for infrastructure engineering are described. In one implementation, a method identifies resources for infrastructure engineering with respect to an organization. The method also sorts the resources based on skills and roles associated with the infrastructure engineering, and then determines multiple teams based on the sorted resources.

21 Claims, 5 Drawing Sheets

RESOURCE ALLOCATION FOR INFRASTRUCTURE ENGINEERING

TECHNICAL FIELD

The present disclosure relates to methods and systems of resource allocation for infrastructure engineering.

BACKGROUND

Challenges faced by infrastructure engineering differ between application software development and the agile practice, which is not a direct fit for the conventional infrastructure work culture. agile software development generally is related to software development methodologies in which software is developed incrementally in iterations. Typically, iterations are measured in a period of time that may vary based on, for example, infrastructure engineering environment. The essence of agility is the cross-functional aspect of teams, and the goal is to develop the teams to have minimum dependency on external resources to deliver work. However, often time, agile principles are hardly applied to infrastructure engineering with respect to an organization when the structure of the organization has extended decision-making time frames. For example, lack of dedicated resourcing, lack of visibility for the development organization on who are executing their Infrastructure tasks, incremental delivery planning, or a slow mindset creates difficulties in applying the agile principles.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein allow collaboration-based engagement process and methodologies for infrastructure engineering. A plurality of resources of an organization are identified for infrastructure engineering with respect to the organization. The plurality of resources are then sorted based at least on skills (e.g., general knowledge such as Java, C++, etc.) and roles (e.g., support, architect, etc.) associated with the plurality of resources. Based on the sorted resources, multiple teams are determined, wherein individual teams have one or more of the resources for one or more skills and the multiple teams share one or more roles. The determined teams are then associated with one or more markets or work items associated with the infrastructure engineering with respect to the organization.

Advantageously, systems and methods described herein help decision makers to understand un-block bottleneck skills (e.g., skills associated with system, network, database engineering, etc.) and to improve working environment and efficiency by leveraging knowledge and talent within the organization. This enables the decision makers to have dedicated point of contact for their particular area, therefore ensuring consistency in communication and lowering learning curve for the particular area. This also speeds up delivery of the projects without compromising the quality of the project, increases the quality in support without hiring unnecessary workforce, and decreases the time spent in trouble shooting issues/bugs.

Figure 1:
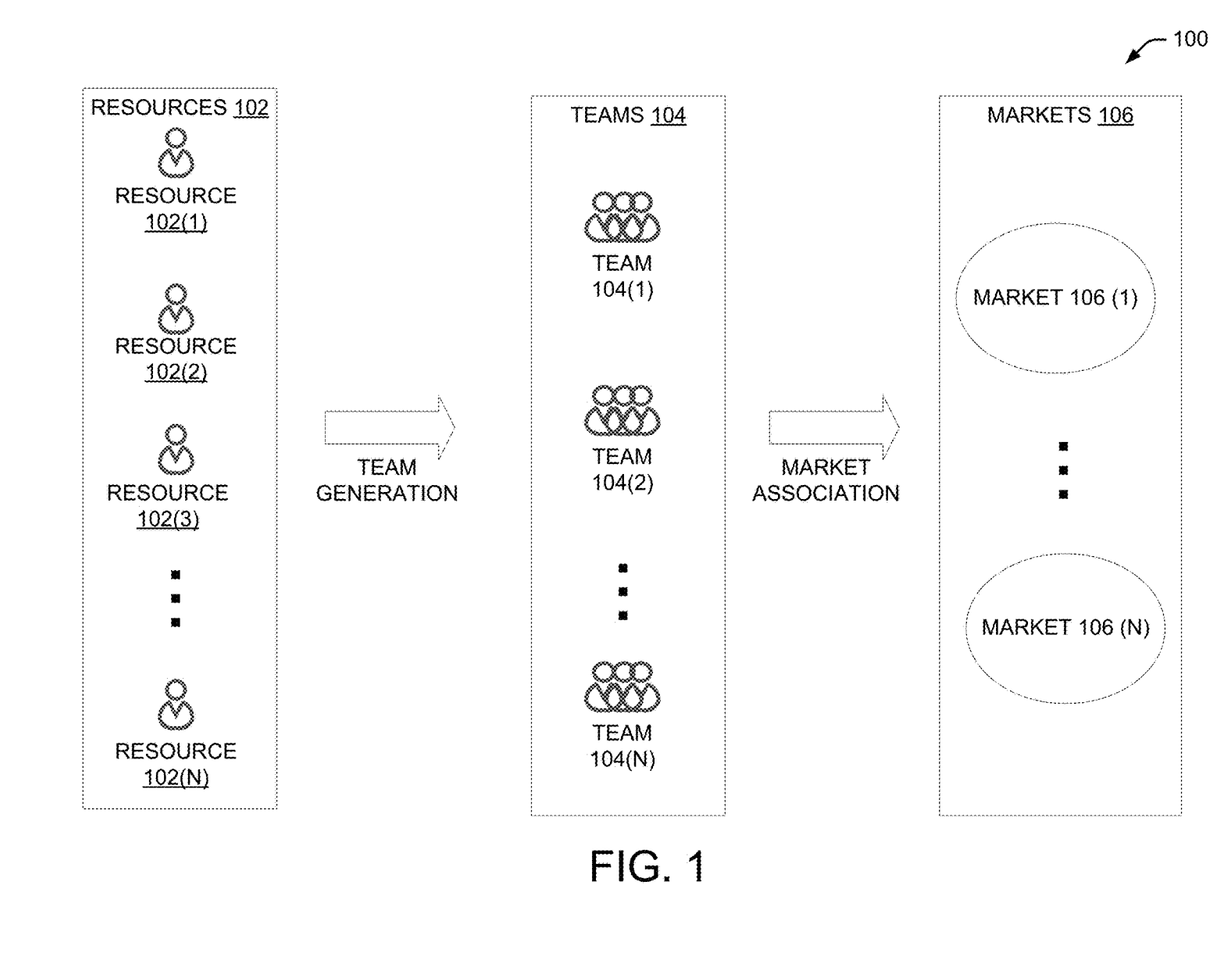
FIG. 1 is a block diagram depicting a framework within which an example embodiment of the present disclosure may be implemented.

FIG. 1 is a block diagram depicting a framework 100 within which an example embodiment of the present disclosure may be implemented. Framework 100 includes resources 102 that have multiple resources, such as resource 102(1), resource 102(2), resource 102(3), . . . and resource 102(n). In some embodiments, the resources may include human resources and/or physical resources. For example, resource information may represent a plurality of resources, which may range from human resources (e.g., computer programmers, administrators, accountants, engineers, consultants, etc.) to physical resources (e.g., computer equipment, infrastructure resources such as real estate or buildings/office space, data center, any type of inventory or manufacturing material, physical equipment items, etc.).

Figure 2:
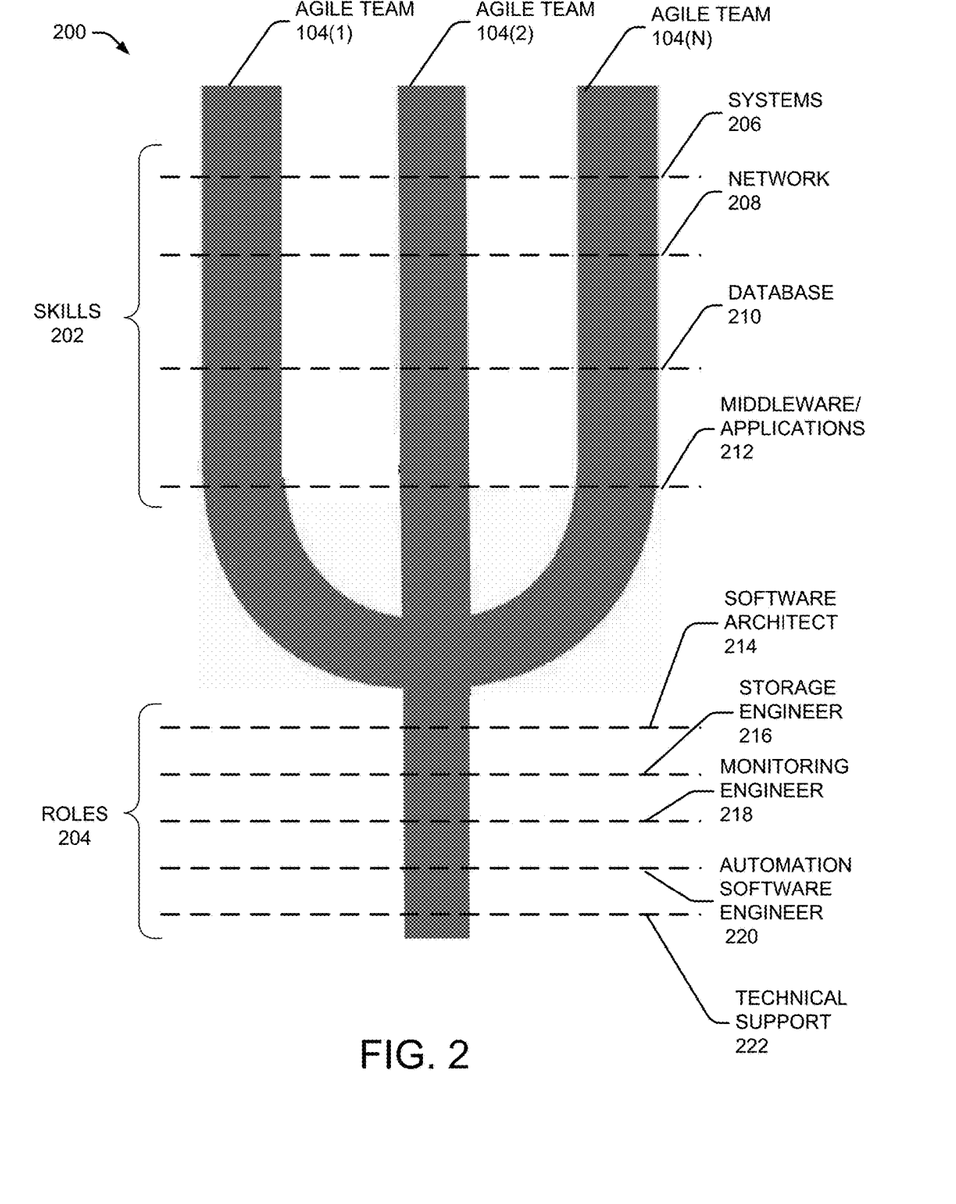
FIG. 2 is a block diagram depicting another framework within which an example embodiment of the present disclosure may be implemented.
Figure 3:
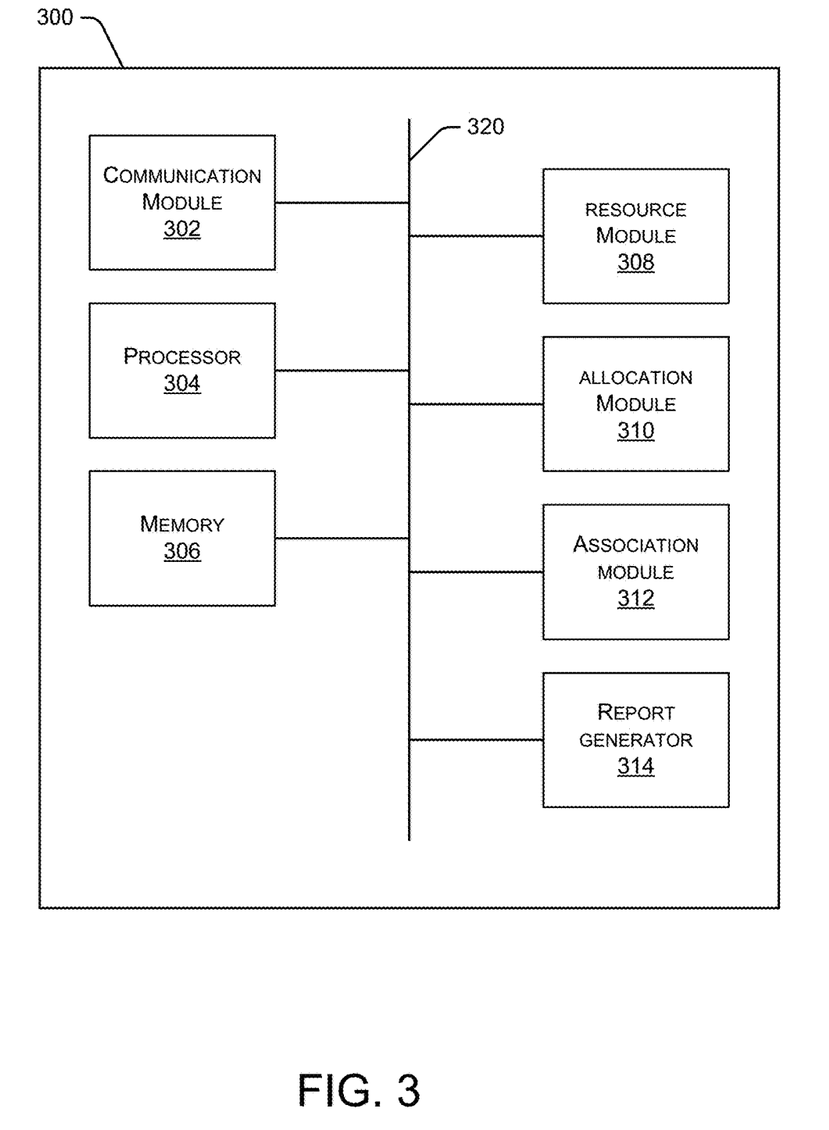
FIG. 3 is a block diagram depicting an embodiment of a computing device configured to implement systems and methods of the present disclosure.

Resource information related to human resources may include attribute information defining one or more of any of the following: type attributes (e.g., full-time employee, part-time employee, contractor, temp, outsourcing partners, etc.), role attributes (e.g., project manager, architect, analyst, QA engineer, database manager/administrator, computer programmer, etc.), role-level attributes (e.g., principal role, secondary role, senior role, entry-level role, etc.), skill attributes (e.g., Java, C++, generally any knowledge/ability to undertake a required activity, etc.), geographic attributes (e.g., one or more cities/countries or other locations where a given human resource is available to work), education attributes (e.g., Ph.D., M.B.A., B.S.C.S., etc.), language attributes (e.g., English, French, German, Chinese, Japanese etc.), cost attributes (e.g., hourly wage, annual salary, etc.), experience attributes (e.g., years of experience working in a particular technical area or on compliance particular type of project), changeability, human fragmentation attributes (e.g., the capability to be assigned to multiple tasks), security attributes (e.g., security clearance, etc.), criticality attributes (e.g., measure of the importance of a given human resource), and/or any combination thereof Resource information related to physical resources may include attribute information defining one or more of any of the following: geographic attributes (e.g., one or more locations where a given physical resource can be used or accessed), cost attributes (e.g., cost to use per hour, cost of supply per unit, etc.), availability attributes (e.g., information indicating times/dates and/or locations that a given physical resource is available for use and not yet assigned), supply attributes (e.g., amount of supply), throughput attributes (e.g., network bandwidth, system capacity, physical space, etc.), security attributes, and/or any combination thereof In some embodiments, the resources 102 may be identified by a computing device (e.g., a server), which is discussed in greater detail in connection with FIG. 3. The identified resources 102, in the context of human resources, may be sorted based on skills and roles associated with the resources 102. The skills may refer to any knowledge/ability of a given human resource to undertake a required activity. The activity may be related to, for example, at least one of systems engineering, network engineering, database engineering, middleware, etc. The skills are staffed within an individual team with a primary and secondary back up to provide cross-sharing of skills and to facilitate career development of the human resources. Certain roles such as, for example, architects, storage engineers, monitoring engineers, automation engineers, and technical support may be shared across teams. The shared roles may provide the right mix for design and early engagement from a support and monitoring perspective. The skills and roles are discussed in greater detail in connection with FIG. 2.

Based on the sorted resources 102, teams 104 may be formed or otherwise determined. The teams 104 may include multiple teams such as team 104(1), team 104(2), . . . , and team 104(n). Each of the teams 104 may have one or more of the resources 102. For example, team 104(1) may include resources 102(1) and 102(3), and team 104(2) may include resources 102(2), 102(3), and 102(n). In some embodiments, the infrastructure engineering may include agile infrastructure engineering, and the teams 104 may be agile teams associated with the agile infrastructure engineering.

After the resources 102 are sorted and allocated into the teams 104, individual teams may be associated with infrastructure engineering with respect to one or more of projects, initiatives, or markets 106 (e.g., e-commerce market, retail market, etc.) associated with the organization. The markets 106 may include multiple markets such as market 106(1), . . . , 106(n). For example, team 104(1) and team 104(2) may be aligned with market 106(1), and team 104(n) may be aligned with market 106(n).

FIG. 2 is a block diagram depicting a framework 200 within which an example embodiment of the present disclosure may be implemented. Framework 200 may include skills 202 and roles 204 that may be demanded, required or otherwise necessary for infrastructure engineering with respect to an organization. One or more of the skills 202 and/or roles 204 may be allocated to one or more of the teams 104. In other words, each or at least one individual team of the teams 104 may have one or more of the skills 202, and multiple teams of the teams 104 may share one or more roles of the roles 204. In some embodiments, the attributes of the skills 202 may include engineering associated with system 206, network 208, database 210, and/or middleware/application 212 for the infrastructure engineering with respect to the organization. In some embodiments, the attributes of the roles 204 may include a software architect 214, a storage engineer 216, a monitoring engineer 218 for software performance, an automation software engineer 220, and/or a technical support 222.

In some embodiments, cross-functional teams may be built based on framework 200. For example, the skills with various skill attributes may be staffed within an individual team (e.g., the team 104(1), the team 104(2), or the team 104(n)) with a primary and secondary backup to provide cross-sharing of skills and to facilitate career development of the human resources. In addition, roles with various role attributes may be shared across teams. The shared roles provide the right mix for design and early engagement from a support and monitoring perspective. Framework 200 helps decision makers of the organization to un-block bottleneck skills such as system, network and database engineers and to increase innovation, pollination and learning within each individual team and/or among the multiple teams. Framework 200 also enables the end user/customer (e.g., upper management) to have dedicated point of contact for a given business area, therefore ensuring consistency in communication and lowering a learning curve for each business area. Framework 200 also helps to speed up delivery of projects, increase the quality in support, decrease the time spent in troubleshooting issues and debugging.

FIG. 3 is a block diagram depicting an embodiment of a computing device 300 configured to implement systems and methods of the present disclosure. Computing device 300 (e.g., a server) performs various functions related to resource allocation for infrastructure engineering as discussed herein. In some embodiments, computing devices 300 may include one or more computing devices that cooperatively implement the functions described herein. As depicted, computing device 300 includes a communication module 302, a processor 304, and a memory 306. Communication module 302 allows computing device 300 to communicate with other systems, such as communication networks, other servers, etc. Processor 304 executes one or more sets instructions to implement the functionality provided by computing device 300. Memory 306 stores these instructions as well as other data used by processor 304 and other modules contained in computing device 300.

Computing device 300 may include a resource module 308 configured to identify a plurality of resources (e.g., resources 102) for infrastructure engineering with respect to an organization. Resource module 308 may also sort the resources 102 based at least in part on the skills 202 and the roles 204 that may be demanded, required or otherwise necessary for infrastructure engineering with respect to the organization. In some embodiments, skills 202 may be associated with at least one of system engineering, network engineering, database engineering, middleware development, or application development for the infrastructure engineering associated with the organization. In these instances, roles 202 may be associated with a software architect, a storage engineer, performance monitoring software engineer, automation software engineer, or a technical support.

The computing device 300 may also include an allocation module 310 configured to form or otherwise determine multiple teams 104 based at least in part on the sorted resources 102. In these instances, at least one individual team of the teams 104 may have one or more of the resources 102 for one or more skills of the skills 202 and, additionally, multiple teams of the teams 104 may share one or more roles of the roles 204.

Computing device 300 may include an allocation module 310 configured to dynamically allocate the resources 102 to one or more of the teams 104 based on parameters (e.g., technology, size, demand, location and business priority that are associated with one or more certain processes of the infrastructure engineering of the organization).

Computing device 300 may also include an association module 312 configured to associate teams 104 with one or more of the markets 106 associated with the organization. In some embodiments, association module 312 may align teams 104 with a work item. In these instances, allocation module 310 may allocate resources 102 among teams 104 based at least in part on at least one of the following: a technology associated with the work item, a size of the work item, an amount of demand associated with the work item, a location associated with the work item, or a business priority of the work item. In some embodiments, a work item may include any item for which the infrastructure engineering management software platform can track for progress such as, for example, time spent working on the work item. Estimates for the time that one or more work items require for completion (e.g., the time to complete certain features or to fix defects) may be entered into computing device 300 during the work item planning process. For example, a work item may be one or more certain processes involved in data center infrastructure engineering.

Computing device 300 may further include a report generator 314 configured to provide reports with information associated with the infrastructure engineering with respect to the organization. Such information may include textual, graphical, audio and/or video information. For example, graphics such as pie charts along with textual annotations may be generated by report generator 314 with respect to one or more aspects of the infrastructure engineering. This feature improves visibility on, for example, resource allocation and status on progress for a given infrastructure engineering task. In some embodiments, the reports provided by report generator 314 may be customized by a user to provide specific fields of data in specific formats according to user input. The information in a given report may, for example, indicate the number of resources allocated to an individual team in infrastructure engineering and the overall number of teams allocated to a given business area (e.g., the market 106(1)) based on parameters (e.g., technology, size, demand, location and business priority that are associated with one or more certain processes of the infrastructure engineering of the organization). In some embodiments, the information may include at least one of the following: market information, information related to one or more of the multiple teams that participate the operational task, information related to infrastructure engineer roles of the one or more teams, information related to an environment associated with the operation task, or a type of the operational task. In some embodiments, report generator 314 may generate a market workload report indicating a comparison between a work volume and corresponding monetary allocation of the infrastructure engineering associated with the organization. In some embodiments, computing device 300 may be configured to allow access to the reports by any and all authorized users (e.g., employees of the organization). For example, employees of the organization may access one or more of the reports generated by reporting generator 314 of computing device 300 via an internal website of the organization.

Each of resource module 308, allocation module 310, association module 312 and report generator 314 may be implemented as hardware, firmware, middleware, and/or software. Although resource module 308, allocation module 310, association module 312 and report generator 314 are depicted as separate modules or units in computing device 300, in some embodiments one or more of resource module 308, allocation module 310, association module 312 and report generator 314 may be integral parts of processor 304. In some embodiments, each of resource module 308, allocation module 310, association module 312 and report generator 314 functions under the control of processor 304.

Figure 4:
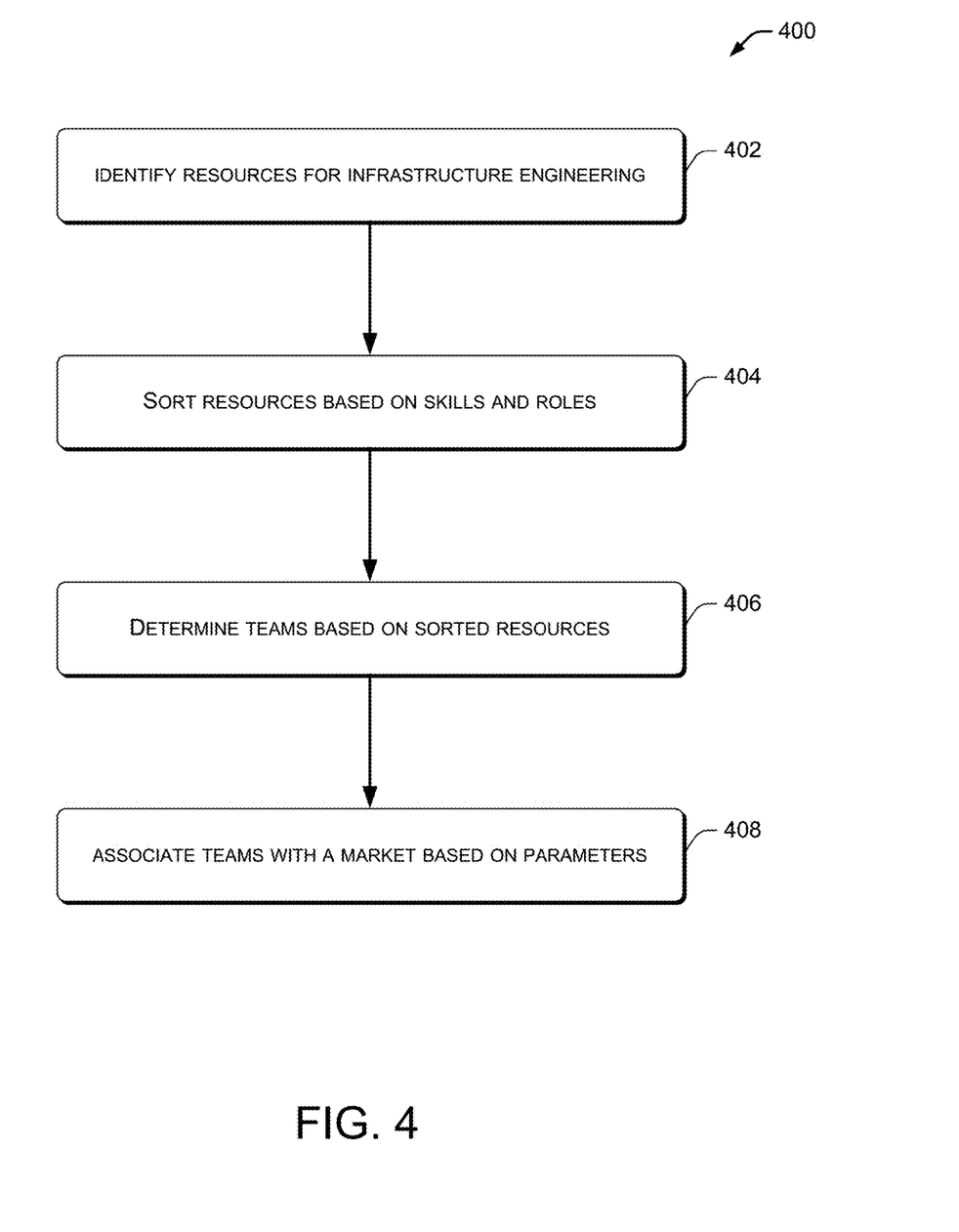
FIG. 4 is a flowchart diagram of an embodiment of a process for resource allocation for infrastructure engineering.

FIG. 4 illustrates an example process 400 for resource allocation for infrastructure engineering. Example process 400 includes one or more operations, actions, or functions. Although illustrated as discrete blocks, various blocks may be divided into additional blocks, combined into fewer blocks, or eliminated, depending on the desired implementation. Process 400 may be implemented by one or more processors including, for example, the computing device 300. For illustrative purposes, the operations described below are performed by processor 304 of computing device 300 as shown in FIG. 3.

At 402, resource module 308, under the control of processor 304, may identify the resources 102 for infrastructure engineering with respect to an organization.

At 404, resource module 308 may also sort the resources 102 based on the skills 202 and the roles 204. In some embodiments, the skills 202 are associated with at least one of system engineering, network engineering, database engineering, middleware development, or application development for the infrastructure engineering associated with the organization. In these instances, the roles 204 are associated with a software architect, a storage engineer, performance monitoring software engineer, automation software engineer, or a technical support. In some embodiments, the infrastructure engineering comprises agile infrastructure engineering, and wherein the multiple teams comprise agile teams associated with the agile infrastructure engineering.

At 406, allocation module 310, under the control of processor 304, may determine the teams 104 based at least in part on the sorted resources 102. In some embodiments, at least one individual team of the teams 104 may have one or more of the resources for one or more skills of the skills 202 and the multiple teams may share one or more roles of the roles 204. In some embodiments, allocation module 310 may dynamically allocate the resources to one or more of the agile teams. For example, the allocation module 310 may allocate the resources among the multiple teams based at least in part on at least one of a technology associated with a work item, a size of the work item, an amount of demand associated with the work item, a location associated with the work item, or a business priority of the work item.

At 408, association module 312, under the control of processor 304, may associate the teams 104 with one or more of the markets 106 associated with the organization. In some embodiments, the association module 312 may align the teams 104 with a work item. In some embodiments, report generator 314, under the control of processor 304, may generate a report of an operational task, and the report may include at least one of market information, information related to one or more of the multiple teams that participate the operational task, information related to infrastructure engineer roles of the one or more teams, information related to an environment associated with the operation task, or a type of the operational task. In some embodiments, report generator 314 may also generate a market workload report indicating a comparison between a work volume and corresponding monetary allocation of the infrastructure engineering associated with the organization.

Figure 5:
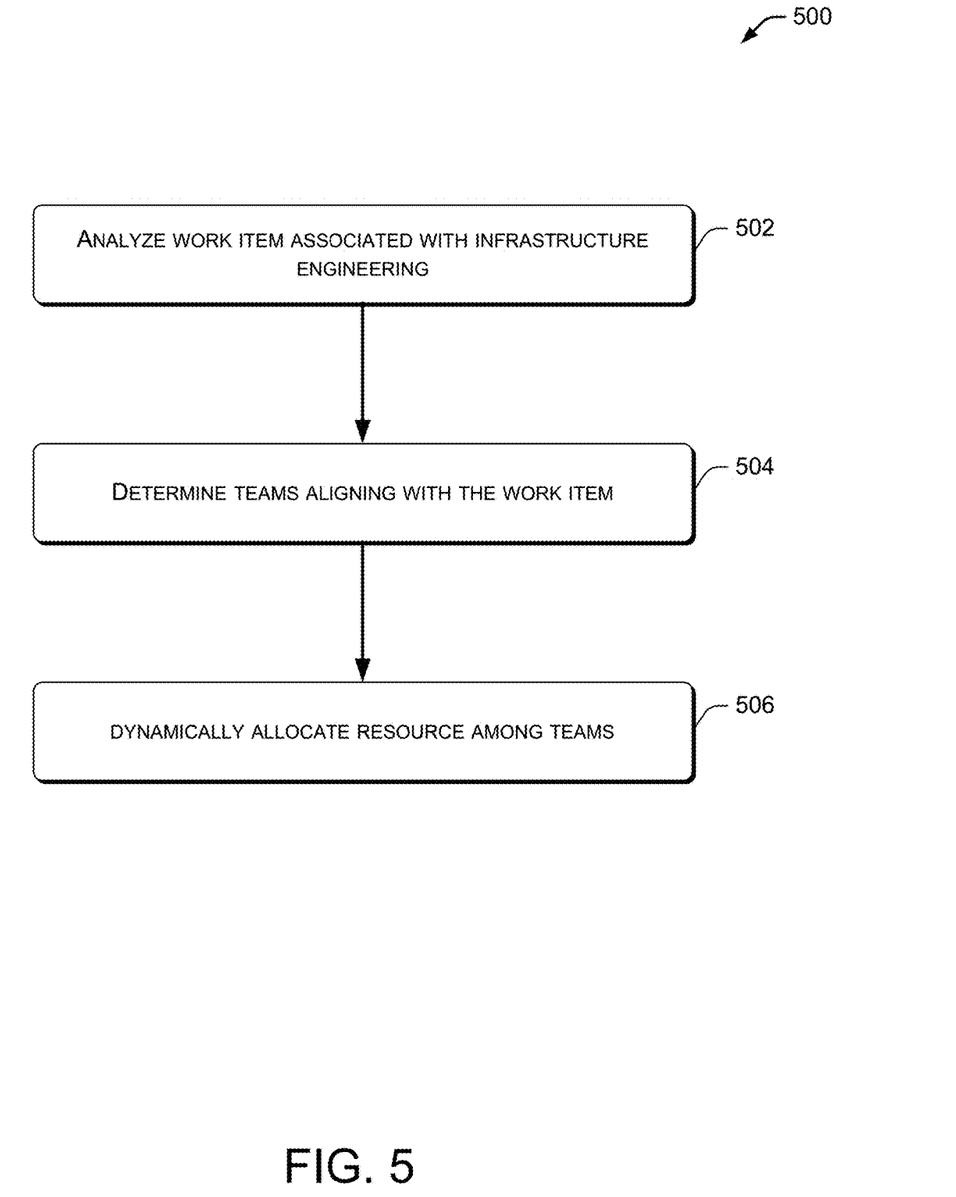
FIG. 5 is a flowchart diagram of another embodiment of a process for resource allocation for infrastructure engineering.

FIG. 5 is a flowchart diagram of another embodiment of a process 500 for resource allocation for infrastructure engineering. Example process 500 includes one or more operations, actions, or functions. Although illustrated as discrete blocks, various blocks may be divided into additional blocks, combined into fewer blocks, or eliminated, depending on the desired implementation. Process 500 may be implemented by one or more processors including, for example, the computing device 300. For illustrative purposes, the operations described below are performed by processor 304 of computing device 300 as shown in FIG. 3.

At 502, resource module 308, under the control of processor 304, may analyze a work item associated with infrastructure engineering associated with an organization.

At 504, allocation module 310, under the control of processor 304, may determine multiple teams aligning with the work item based at least in part on the resources 102 of the organization. In some embodiments, at least one individual team of the teams 104 may have one or more of the resources for a skill of the skills 202 and multiple teams of the teams 104 may share one or more roles.

In some embodiments, the skill may be associated with at least one of system engineering, network engineering, database engineering, middleware development, or application development for the infrastructure engineering associated with the organization. In these instances, the roles may be associated with a software architect, a storage engineer, performance monitoring software engineer, automation software engineer, or a technical support. In some embodiments, the infrastructure engineering comprises agile infrastructure engineering, and wherein the teams 104 comprise agile teams associated with the agile infrastructure engineering.

At 506, allocation module 310, under the control of processor 304, may dynamically allocate the resources 102 among the teams 104 based at least in part on parameters associated with the work item and/or the resource 102 of the organization. In some embodiments, allocation module 310 may determine relationship between the teams 104 with respect to the skills 202 and/or the roles 204 that are demanded in the work item. In some instances, allocation module 310 may also optimize the resources 102 of the teams 104 using the relationship to facilitate self-development of team members of the teams 104. For example, allocation module 310 may facilitate self-development for individual members of the teams 104 by identifying one or more of the skills 202 and/or the roles 204 within an individual team and/or among the teams 104. For example, allocation module 310 may facilitate skill development for an individual team by sharing information associated with the resources 102 among the teams 104 such that one team may teach another team with respect to particular skills. In some embodiments, allocation module 310 may identify issues associated with the work item based on allocated resources and resource demands of the work item.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:

identifying, by a computer system using one or more processors, a plurality of resources for agile infrastructure engineering with respect to an organization, wherein the plurality of resources comprise human resources and physical resources, wherein the physical resources comprise equipment infrastructure, and wherein the agile infrastructure engineering comprises a collaboration-based methodology associated with one or more projects of an e-commerce work item or a market;

sorting, by a resource system, the plurality of resources based at least in part on a plurality of skills, a plurality of attribute information, and a plurality of roles associated with the plurality of resources, wherein first attribute information of the plurality of attribute information is associated with the human resources and comprises education attributes, changeability attributes, and human fragmentation attributes, and wherein second attribute information of the plurality of attribute information is associated with the physical resources and comprises geographic attributes, cost attributes, and supply attributes;

determining, by an allocation system, multiple teams based at least in part on the plurality of resources, as sorted, at least one first individual team of the multiple teams having one or more first resources of the plurality of resources for one or more first skills of the plurality of skills, the first attribute information, the second attribute information, and the multiple teams sharing one or more roles of the plurality of roles aligned to the one or more projects of the e-commerce work item and including particular role attributes to optimize cross-functional learning among the multiple teams, wherein the market comprises the e-commerce work item, and wherein the multiple teams comprise one or more agile teams;

aligning, by an association system, the multiple teams with the one or more projects of the e-commerce work item, wherein estimates of time required for completion of the one or more projects of the e-commerce work item are tracked by a report generator;

obtaining, by the allocation system, a first set of parameters comprising a technology, a size, a demand, a location, and a business priority to allocate among the multiple teams based on at least the technology associated with the one or more projects of the e-commerce work item, the size of the one or more projects of the e-commerce work item, an amount of the demand associated with the one or more projects of the e-commerce work item, the location associated with the one or more projects of the e-commerce work item, the business priority of the one or more projects of the e-commerce work item, and a skill staffing with a primary backup and a secondary backup to provide cross-sharing of skills of the plurality of skills required by the one or more projects of the e-commerce work item;

dynamically allocating, by the allocation system, the plurality of resources among the multiple teams according to the first set of parameters aligned with the one or more projects of the e-commerce work item;

generating, by the report generator in data communication with the allocation system and the association system, a market workload report associated with the market indicating at least a comparison between a work volume and a monetary allocation of the one or more projects of the e-commerce work item based on the agile infrastructure engineering among the multiple teams, the market workload report comprising audio or video information reporting on at least a status of the dynamically allocating of the plurality of resources aligned with the one or more projects of the e-commerce work item; and determining, by the allocation system, other multiple teams for one or more remaining projects of the e-commerce work item based at least in part on the market workload report associated with the market and the plurality of resources, as sorted, at least one second individual team of the other multiple teams having one or more second resources of the plurality of resources for one or more second skills of the plurality of skills, one or more attributes of a plurality of attributes, and the other multiple teams sharing the one or more roles of the plurality of roles aligned to the one or more projects of the e-commerce work item.

2. The method of claim 1, wherein the plurality of skills are associated with at least one of system engineering, network engineering, database engineering, middleware development, or application development for the agile infrastructure engineering with respect to the organization.

3. The method of claim 2, wherein the plurality of roles are associated with a software architect, a storage engineer, a performance monitoring software engineer, an automation software engineer, or a technical support.

4. The method of claim 1, further comprising:

dynamically allocating, by the allocation system, one or more resources of the plurality of resources to the one or more agile teams, wherein the one or more resources comprises the human resources and the physical resources.

5. The method of claim 1, further comprising:

associating, by the association system, the multiple teams with the market associated with the organization; and generating, by the report generator, a report of an operational task.

6. The method of claim 5, wherein the report of the operational task includes at least one of market information, information related to one or more of the multiple teams that participate in the operational task, information related to agile infrastructure engineer roles of the one or more of the multiple teams, information related to an environment associated with the operational task, or a type of the operational task.

7. The method of claim 5, wherein:

generating, by the report generator, the market workload report further comprises providing access to the market workload report associated with the market by authorized users via an internal website of the organization.

8. The method of claim 1, further comprising:

dynamically allocating, by the allocation system, one or more resources of the plurality of resources to the one or more agile teams associated with the agile infrastructure engineering, wherein the plurality of resources comprise the human resources and the physical resources;

associating, by the one or more processors, the multiple teams with the market associated with the organization;

generating, by the report generator, a report of an operational task; and wherein:

generating, by the report generator, the market workload report associated with the market further comprises providing access to the market workload report associated with the market by authorized users via an internal website of the organization; and wherein:

the plurality of skills are associated with at least one of system engineering, network engineering, database engineering, middleware development, or application development for the agile infrastructure engineering with respect to the organization;

the plurality of roles are associated with a software architect, a storage engineer, performance monitoring software engineer, automation software engineer, or a technical support; and the operational task report includes at least one of market information, information related to one or more of the multiple teams that participate in the operational task, information related to agile infrastructure engineer roles of the one or more of the multiple teams, information related to an environment associated with the operational task, or a type of the operational task.

9. The method of claim 1, wherein sorting, by the resource system, further comprised sorting the plurality of resources into individual teams associated with one or more projects, initiatives, or markets associated with the organization, wherein the plurality of resources comprise the human resources and the physical resources.

10. A method comprising:

analyzing, by a computer system using one or more processors, an e-commerce work item associated with agile infrastructure engineering with respect to an organization, wherein the e-commerce work item comprises one or more projects;

sorting, by a resource system, a plurality of resources based at least in part on a plurality of skills, a plurality of attribute information, and a plurality of roles associated with the plurality of resources, wherein the plurality of resources comprise human resources and physical resources, wherein the physical resources comprise equipment infrastructure, and wherein the agile infrastructure engineering comprises a collaboration-based methodology associated with the one or more projects of the e-commerce work item or a market;

determining, by an allocation system, multiple teams aligning with the one or more projects of the e-commerce work item based at least in part on the plurality of resources of the organization, as sorted, at least one first individual team of the multiple teams having a first one or more of the plurality of resources for a first one or more skills of the plurality of skills, first attribute information, second attribute information, and the multiple teams sharing one or more roles aligned to the one or more projects of the e-commerce work item and including particular role attributes to optimize cross-functional learning among the multiple teams, wherein the market comprises the e-commerce work item, and wherein the multiple teams comprise one or more agile teams, wherein the first attribute information of the plurality of attribute information is associated with the human resources and comprises education attributes, changeability attributes, and human fragmentation attributes, and wherein the second attribute information of the plurality of attribute information is associated with the physical resources and comprises geographic attributes, cost attributes, and supply attributes;

aligning, by an association system, the multiple teams with the one or more projects of the e-commerce work item, wherein estimates of time required for completion of the one or more projects of the e-commerce work item are tracked by a report generator;

obtaining, by the allocation system, a first set of parameters comprising a technology, a size, a demand, a location, and a business priority to allocate among the multiple teams based on at least the technology associated with the one or more projects of the e-commerce work item, the size of the one or more projects of the e-commerce work item, an amount of the demand associated with the one or more projects of the e-commerce work item, the location associated with the one or more projects of the e-commerce work item, the business priority of the one or more projects of the e-commerce work item, and a skill staffing with a primary and a secondary backup to provide cross-sharing of skills required by the one or more projects of the e-commerce work item;

dynamically allocating, by the allocation system, the plurality of resources among the multiple teams according to the first set of parameters aligned with the one or more projects of the e-commerce work item;

generating, by the report generator in data communication with the allocation system and the association system, a market workload report associated with the market indicating at least a comparison between a work volume and a monetary allocation of the one or more projects of the e-commerce work item based on the agile infrastructure engineering among the multiple teams, the market workload report comprising audio or video information reporting on at least a status of the dynamically allocating of the plurality of resources aligned with the one or more projects of the e-commerce work item; and determining, by the allocation system, other multiple teams for one or more remaining projects in the e-commerce work item based at least in part on the market workload report associated with the market and the plurality of resources, as sorted, at least one second individual team of the other multiple teams having a second one or more resources of the plurality of resources for a second one or more skills of the plurality of skills, one or more attributes of a plurality of attributes, and the other multiple teams sharing the one or more roles of the plurality of roles aligned to the one or more projects of the e-commerce work item.

11. The method of claim 10, wherein the skill is associated with at least one of system engineering, network engineering, database engineering, middleware development, or application development for the agile infrastructure engineering with respect to the organization.

12. The method of claim 11, wherein the one or more roles are associated with a software architect, a storage engineer, a performance monitoring software engineer, automation software engineer, or a technical support.

13. The method of claim 10, further comprising:

determining a relationship between the one or more agile teams with respect to the first one or more skills or the one or more roles that are demanded in the one or more projects of the e-commerce work item; and optimizing the plurality of resources of the one or more agile teams using the relationship, wherein the plurality of resources comprise the human resources and the physical resources.

14. The method of claim 10, further comprising:

identifying issues associated with the one or more projects of the e-commerce work item based on allocated resources of the plurality of resources and a resource demand of the one or more projects of the e-commerce work item.

15. The method of claim 10, further comprising:

determining a relationship between the one or more agile teams associated with the agile infrastructure engineering with respect to the first one or more skills or the one or more roles that are demanded in the one or more projects of the e-commerce work item;

optimizing the plurality of resources of the one or more agile teams using the relationship; and identifying issues associated with the one or more projects of the e-commerce work item based on allocated resources of the plurality of resources and a resource demand of the one or more projects of the e-commerce work item, wherein:

the first one or more skills are associated with at least one of system engineering, network engineering, database engineering, middleware development, or application development for the agile infrastructure engineering with respect to the organization; and the one or more roles are associated with a software architect, a storage engineer, performance monitoring software engineer, automation software engineer, or a technical support.

16. The method of claim 10, wherein sorting, by the resource system, further comprises sorting the plurality of resources into individual teams associated with one or more projects, initiatives, or markets associated with the organization, wherein the plurality of resources comprise the human resources and the physical resources.

17. An apparatus comprising:

a memory configured to store data and one or more sets of instructions; and one or more processors in data communication with the memory, the one or more processors configured to execute the one or more sets of instructions and perform operations comprising:

identifying a plurality of resources for agile infrastructure engineering with respect to an organization, wherein the plurality of resources comprise human resources and physical resources, wherein the physical resources comprise equipment infrastructure, and wherein the agile infrastructure engineering comprises a collaboration-based methodology associated with one or more projects of an e-commerce work item or a market;

sorting the plurality of resources based at least in part on a plurality of skills and a plurality of roles associated with the plurality of resources;

determining multiple teams based at least in part on the plurality of resources, as sorted, at least one first individual team of the multiple teams having one or more first resources of the plurality of resources for one or more first skills of the plurality of skills, first attribute information, second attribute information, and the multiple teams sharing one or more roles of the plurality of roles aligned to the one or more projects of the e-commerce work item and including particular role attributes to optimize cross-functional learning among the multiple teams, wherein the market comprises the e-commerce work item, and wherein the multiple teams comprise one or more agile teams, wherein the first attribute information of a plurality of attribute information is associated with the human resources and comprises education attributes, changeability attributes, and human fragmentation attributes, and wherein the second attribute information of the plurality of attribute information is associated with the physical resources and comprises geographic attributes, cost attributes, and supply attributes;

aligning the multiple teams with the one or more projects of the e-commerce work item, wherein estimates of time required for completion of the one or more projects of the e-commerce work item are tracked by a report generator;

obtaining a first set of parameters comprising a technology, a size, a demand, a location, and a business priority to allocate among the multiple teams based on at least the technology associated with the one or more projects of the e-commerce work item, the size of the one or more projects of the e-commerce work item, an amount of the demand associated with the one or more projects of the e-commerce work item, the location associated with the one or more projects of the e-commerce work item, the business priority of the one or more projects of the e-commerce work item, and a skill staffing with a primary and a secondary backup to provide cross-sharing of skills of the plurality of skills required by the one or more projects of the e-commerce work item;

dynamically allocating the plurality of resources among the multiple teams according to the first set of parameters aligned with the one or more projects of the e-commerce work item;

generating a market workload report associated with the market indicating at least a comparison between a work volume and a monetary allocation of the one or more projects of the e-commerce work item based on the agile infrastructure engineering among the multiple teams, the market workload report comprising audio or video information reporting on at least a status of the dynamically allocating of the plurality of resources aligned with the one or more projects of the e-commerce work item; and determining other multiple teams for one or more remaining projects in the e-commerce work item based at least in part on the market workload report associated with the market and the plurality of resources, as sorted, at least one second individual team of the other multiple teams having one or more second resources of the plurality of resources for one or more second skills of the plurality of skills, one or more attributes of a plurality of attributes, and the other multiple teams sharing the one or more roles of the plurality of roles aligned to the one or more projects of the e-commerce work item.

18. The apparatus of claim 17, wherein the plurality of skills are associated with at least one of system engineering, network engineering, database engineering, middleware development, or application development for the agile infrastructure engineering with respect to the organization.

19. The apparatus of claim 18, wherein the plurality of roles are associated with a software architect, a storage engineer, a performance monitoring software engineer, automation software engineer, or a technical support.

20. The apparatus of claim 17, wherein:
the plurality of skills are associated with at least one of system engineering, network engineering, database engineering, middleware development, or application development for the agile infrastructure engineering with respect to the organization;
the plurality of roles are associated with a software architect, a storage engineer, a performance monitoring software engineer, automation software engineer, or a technical support;
and
the multiple teams comprise the one or more agile teams associated with the agile infrastructure engineering.

21. The apparatus claim 17, wherein sorting the plurality of resources, further comprises sorting the plurality of resources into individual teams associated with one or more projects, initiatives, or markets associated with the organization, wherein the plurality of resources comprise the human resources and the physical resources.

* * * * *